C. W. MERRILL.
FILTER.
APPLICATION FILED DEC. 8, 1915.
1,259,032.
Patented Mar. 12, 1918.
4 SHEETS—SHEET 2.
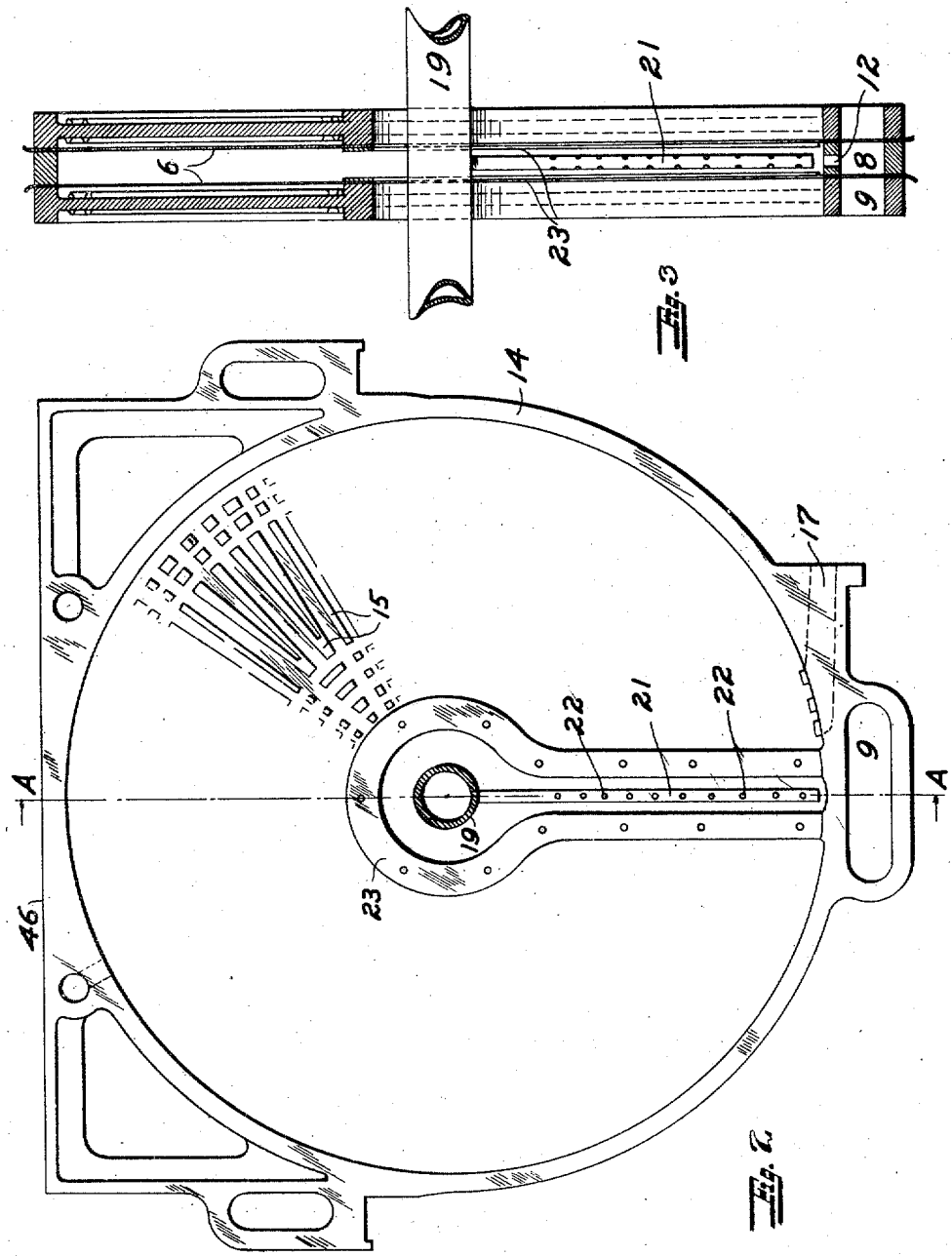
WITNESS
J. B. Gardner
INVENTOR.
CHAS. W. MERRILL
BY White & Prost
HIS ATTORNEYS.

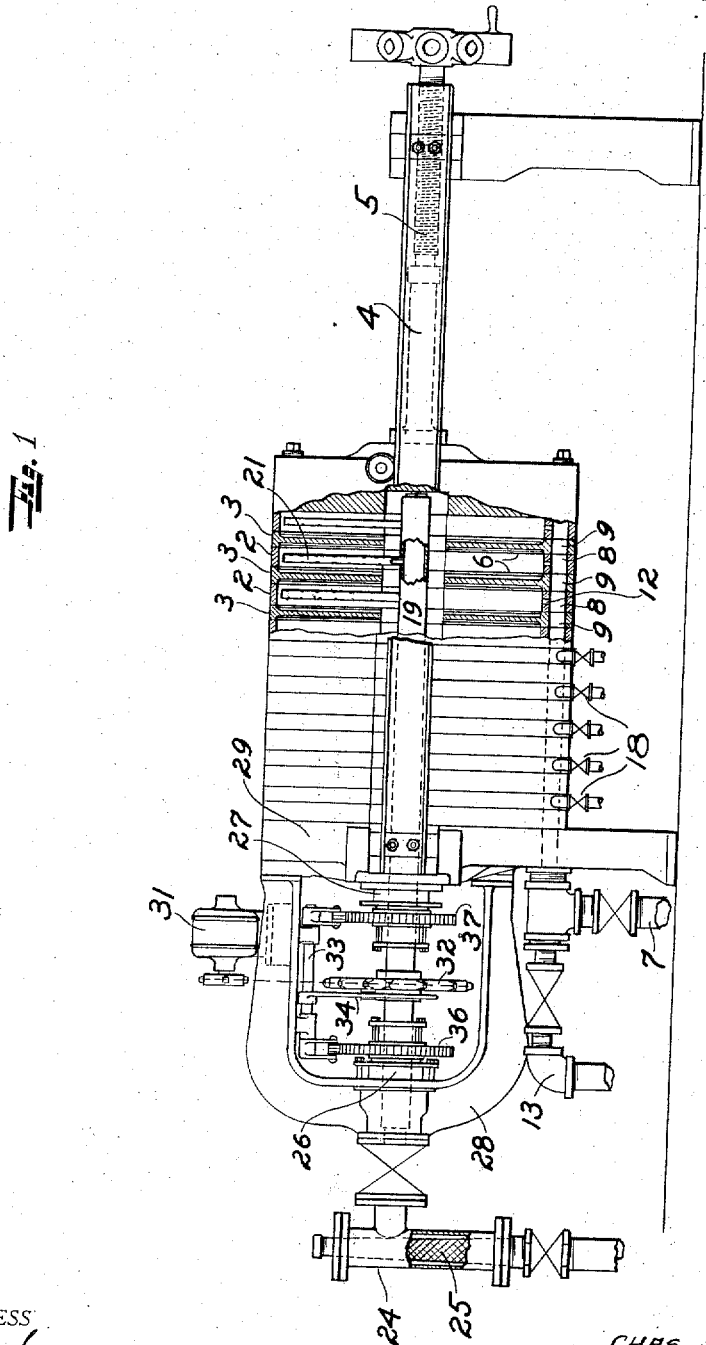

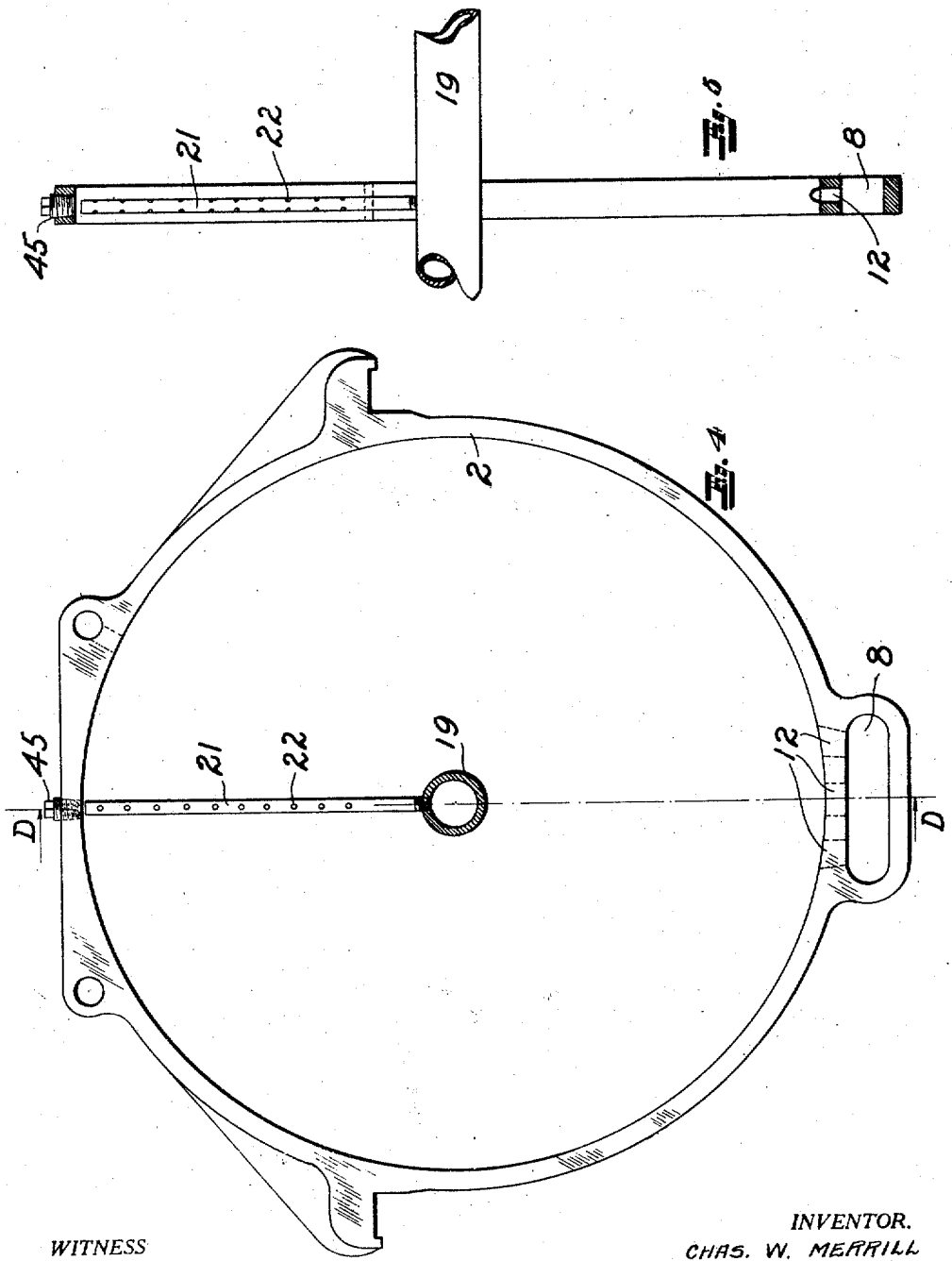

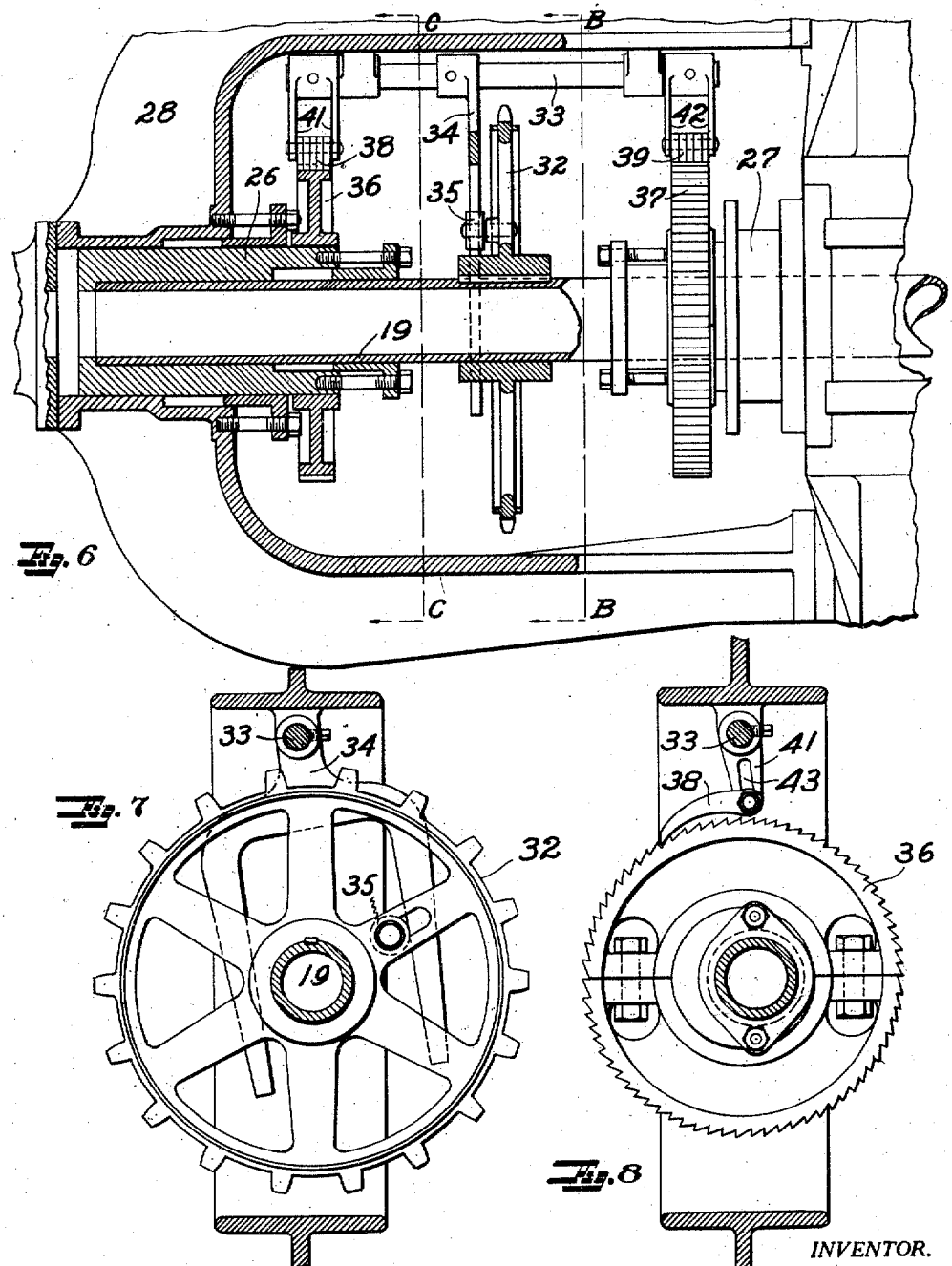

UNITED STATES PATENT OFFICE.

CHARLES W. MERRILL, OF BERKELEY, CALIFORNIA.

FILTER.

1,259,032.     Specification of Letters Patent.     Patented Mar. 12, 1918.

Application filed December 8, 1915. Serial No. 65,689.

*To all whom it may concern:*

Be it known that I, CHARLES W. MERRILL, a citizen of the United States, and a resident of Berkeley, county of Alameda, and State of California, have invented a certain new and useful Filter, of which the following is a specification.

The invention relates to filters for use in metallurgical and comparable processes and particularly to clarifying filters and to means for removing the deposited fine solids or semi-solids from the filtering medium.

An object of the invention is to provide means for removing the solid or semi-solid material from the filtering medium.

Another object of the invention is to provide means for thoroughly cleaning the entire surface of the filtering medium.

A further object of the invention is to provide a filter press composed of separable units with means for removing the solid or semi-solid material from the filtering mediums and for sluicing the removed material from the filter press.

The invention possesses other advantageous features, some of which, with the foregoing, will be set forth at length in the following description, where I shall outline in full that form of the invention which I have selected for illustration in the drawings accompanying and forming part of the present specification. In said drawings I have shown one specific form of my generic invention, but it is to be understood that I do not limit myself to such forms because my invention may be embodied in a multiplicity of forms, each being a species of my said invention. It is also to be understood that by the claims succeeding the description of my invention, I desire to cover the invention in whatever form it may be embodied.

Clarifying filters are employed in metallurgical and other processes for filtering or clarifying cloudy solutions containing small amounts of very fine solids or semisolids in solution. The filtration of such solutions produces a layer of extremely fine slime on the filtering medium which greatly decreases the perviousness of the filtering medium, thereby rapidly decreasing the capacity of the filter. The fine slime acts almost as a varnish and a very thin layer thereof is sufficient to greatly reduce the capacity of the filter. The fine slime adheres very strongly to the filtering medium and this characteristic together with the thinness of the layer renders it difficult of removal.

Clarifying filters have been constructed in the form of filter presses composed of separable filter elements and it has been the custom to separate these elements in order that the fine slimes may be scrubbed or otherwise removed from the filtering mediums. It has been proposed heretofore to remove the thin layers of fine slime without separating the elements of the filter, by discharging jets of fluid from a sluicing pipe arranged within the filter. This pipe has been arranged adjacent the lower ends of the filter frames and the fluid has been discharged from the pipe into the chamber separating two filter frames. The jets of fluid were directed almost parallel to the surface of the filtering mediums, but in many instances they have proved ineffective in removing the slimes, particularly when the slimes were deposited in a very thin tenacious layer.

In accordance with the present invention, I employ streams of liquid, gas or vapor for removing the slimes from the filtering mediums and these streams or jets are directed against the filter mediums from points in front of them, so that the slimes are removed. These jets may be arranged to strike the filtering medium perpendicularly or at a slight angle to the perpendicular so that the jets will produce an effective scouring and cutting action on the slime layer. The structure from which the jets discharge against the filtering mediums is rotatable so that the jets may be directed against all parts of the surface of the filter medium and said structure is preferably centrally mounted in the filter. The structure is also preferably given an eccentric motion with respect to its axis to insure the impingement of the jets against the entire surface of the filtering medium. The filtering mediums may comprise any suitable filter elements arranged in a filter such as filter plates or filter leaves and the invention is equally applicable for use in connection with filter plates or filter leaves. In the drawings I have shown the invention as embodied in a filter press comprising a plurality of filter plates and will so describe it in the specification, but it is to be understood that the invention is not limited to pressure filters.

When employed in a built up filter, either of the pressure or vacuum types, means are provided for permitting the various units of the filter to be separated for the purposes of repair or replacement of the filtering mediums, or for other purposes.

In the drawings:

Figure 1 is a side elevation of one embodiment of the filter of my invention, part thereof being shown in section.

Fig. 2 is an elevation of one form of filter plate, a part of the surface thereof being shown in detail.

Fig. 3 is a vertical section of two filter plates with the intermediate container frame and jet directing structure, taken on the line A—A Fig. 2.

Fig. 4 is an elevation of one form of container frame.

Fig. 5 is a vertical section of the container frame taken on the line D—D of Fig. 4.

Fig. 6 is an elevation, partly in section, of the means for rotating the sluicing structure and for producing an eccentric motion thereof.

Fig. 7 is a section taken on the line B—B Fig. 6.

Fig. 8 is a section taken on the line C—C Fig. 6.

In the drawings, I have shown the invention as embodied in a filter press, consisting of a series of alternately arranged container frames 2 and filter plates 3 mounted on a suitable structure 4 and held together by a screw 5, but the invention may be embodied in filters of the vacuum or gravity types. The solution to be filtered is introduced into the container frames, the liquid passes through the filtering medium 6 and the fine solid or semi-solid material is deposited on the filtering medium. The solution to be filtered is fed to the filter through the pipe 13 and passes into the filter through the conduit formed by the alined apertures 8 and 9 in the container frames and filter plates respectively. The circular interior of the container frame communicates with the conduit thus formed through passages 12, so that the solution flows to the container frames. Water or other liquid for impoverishing the thin layer of slime formed on the filtering mediums may be introduced into the conduit through the pipe 13. The filter plate is provided on its surface within the circular peripheral edge 14 with a plurality of projections or ribs 15, which act as supports for the filter cloth 6, the channels between the projections serving as passages for the filtrate. The filtrate flows through these passages to the bottom of the filter plate, whence it discharges through the passage 17, which is provided with a valve 18. A filter cloth 6 is preferably arranged on each side of the filter plate and the filtrate from both sides of the plate passes through the passage 17.

The filter plate is provided with an aperture, preferably centrally arranged, through which a rotatable, horizontal pipe 19 extends. Screwed into or otherwise attached to the pipe 19 and preferably extending at a right angle to the axis thereof, are a plurality of closed end pipes 21, one or more lying in each container frame 2. Each pipe 21 extends outward adjacent to the wall of the container frame and is provided on its side adjacent the filter mediums with nozzles or apertures 22 through which jets of fluid are projected against the filter mediums. These apertures may be round or slotted and may be arranged to direct the jets perpendicularly to the filter medium or at an angle to the perpendicular.

The filter cloths 6 are clamped in place between the peripheral walls of the container frames and filter plates and the cloths are provided with apertures which register with the passages 8 and 9 and with the passage through which the pipe 19 extends. The edges of the cloth at the central aperture are secured and tightly held to the filter plate by suitable clamps, such as the clamp 23.

The fluid which is employed for sluicing the layers of solid or semi-solid material from the filter cloths is introduced into the pipe 19 from the pipe 24 which is provided with a conical shaped screen 25, which arrests any large particles of material in the sluicing fluid. By making the screen conical in form and arranging it longitudinally in the pipe 24, a large screening area is obtained in a small space. The pipe 19 is rotatable so that the jets of fluid from the pipes or arms 21 may be directed to all parts of the surface of the filter cloths. The pipe 19 is mounted in suitable stuffing boxes 26 and 27 arranged respectively in the yoke 28 and the head frame 29 and means are provided for rotating the pipe. In the present instance the rotating means comprises a motor 31 which is connected to a sprocket 32 secured to the pipe intermediate its bearings. The sluiced material exits through apertures 12 into channel 8 and out through pipe 7.

With certain materials, in order that the sluicing jets may reach and thoroughly clean the entire surface of the filtering medium, it is important that the jets impinge upon the medium at all parts of the surface, since the nature of the layer of solid or semi-solid material is such that it is removed only at those places at which the jets strike. If the apertures through which the jets discharge are spaced apart such distance that the points of impingement of the jets are separated, the rotation of the sluicing liquid pipe 19 would cause such jets to cleanse circular zones on the filter cloths which would be separated by circular zones of uncleansed areas. To obviate this formation of cleansed and uncleansed zones, I have provided means whereby the sluicing fluid pipe may be given an eccentric movement the cycle of the eccentric movement requiring a plurality of revolutions of the pipe for its completion. By the employment of this arrangement the radial disposition of the jets is changed slightly at each revolution of the sluicing fluid pipe, so that in a plurality of revolutions of the pipe, all portions of the surface of the filtering medium are exposed to the impinging action of the jets.

One method of accomplishing this result is shown in Figs. 6, 7 and 8, in which the rotatable pipe 19 is eccentrically mounted in the rotatable stuffing boxes 26 and 27, so that rotation of the stuffing boxes will cause the axis of the pipe to travel in a circle. Means are provided for causing the rotation of the pipe about its axis to produce a rotation of the stuffing boxes. Secured to the shaft 33 which is supported by the yoke frame 28 is a forked arm 34 which straddles the pipe 19 and lies close to the sprocket 32 thereon. Radially adjustably mounted on the sprocket 32 is a roller 35 which, during the rotation of the sprocket, engages the forks of the arm 34 and causes the shaft 33 to be rocked. The amount of rocking for each revolution of the sprocket may be varied by adjusting the position of the roller 35. Secured to the rotatable stuffing boxes 26 and 27 are ratchet wheels 36—37 which are engaged by pawls 38—39 pivoted to the arms 41—42 secured to the shaft 33. Each arm is preferably provided with a slot 43 through which the pawl pivot extends, so that the throw of the pawls may be varied. Each complete rotation of the sluicing fluid pipe 19 is accompanied by a partial rotation of the stuffing boxes, so that the position of the pipe with relation to the filtering mediums is changed at each revolution. The ratio of the rate of the revolution of the pipe to the rate of revolution of the stuffing boxes may be varied by varying the angle through which the shaft 33 rocks, the lever arm of the pawl, or both.

It is essential at times that the various units of the filter be separated, such as for the renewal or repair of the filter cloths, and in order to permit this separation, means are provided for removing the sluicing pipes 21 or for permitting the filter plates to be moved past them. In Figs. 4 and 5 I have shown a construction of the container frame 2 which contemplates the removal of the sluicing pipes 21 from the filter. In this construction, the container frame is provided with an aperture, normally closed by a plug 45, with which the sluicing pipe may be moved into alinement. The plug is removed from the aperture and a tool inserted, which grips the pipe, to permit it to be unscrewed from the pipe 19 and removed. When all of the pipes 21 have been removed, the units of the filter may be separated. This method, however, presents several disadvantageous features, which render its use in practice somewhat inefficient.

A preferable arrangement is shown in Fig. 2 in which the filter plate is provided with an opening extending therethrough, through which the sluicing pipes pass as the filter plates are separated. The central pipe 19 is turned to bring the sluicing pipes into alinement with the apertures so that the pipes do not interfere with the separation of the plates. The filter fabric is provided with an aperture corresponding to the aperture in the plate and the fabric is clamped tightly to the plate around the aperture by the horseshoe shaped clamp 23.

In order that the filter fabric may lie flat against the filter plate, during the assembling of the filter, and not wrinkle or buckle, the filter plate is provided with a straight top edge 46, preferably horizontal, and the fabric hangs down from this edge in a smooth sheet.

I claim:

1. In a filter, a plurality of filter surfaces, and a pipe arranged in front of each surface and relatively movable in a plane parallel thereto, each of said pipes being provided with apertures for directing streams of fluid against the adjacent filter surface.

2. In a filter, a plurality of vertically arranged filter surfaces, a pipe adapted to be rotated in a vertical plane arranged in front of each surface, said pipes being provided with apertures for directing streams of fluid against the filter surfaces and means for rotating said pipes.

3. In a filter, a plurality of spaced filter surfaces, a pipe arranged adjacent said filter surfaces, hollow arms on said pipe lying in the space between the filter surfaces, said arms being provided with apertures for directing streams of fluid against the said surfaces, and means for producing a relative movement of the arms and filter elements.

4. In a filter, a plurality of vertically arranged spaced filter elements, a horizontal pipe extending through said elements and a plurality of pipes secured to said horizontal pipe and lying in front of said elements, said pipes being provided with apertures for directing streams of fluid against the surfaces of the filter elements, means for introducing fluid under pressure into said horizontal pipe and means external to the filter for rotating said pipe relatively to said elements.

5. In a filter, a plurality of filter plates, container frames separating the filter plates and means in the container frames and arranged in front of the plates for directing streams of fluid against the surfaces of said plates.

6. In a filter, a plurality of filter plates, container frames separating the filter plates and movable pipes in the container frames provided with apertures for directing streams of fluid against the surfaces of the filter plates.

7. In a filter, a plurality of spaced filter elements, each provided with an aperture extending therethrough, said apertures being alined, a pipe extending through said apertures and hollow arms on said pipe lying in front of the elements, said arms being provided with apertures for directing streams of fluid against the surfaces of the filter elements.

8. In a filter, a plurality of spaced filter elements, each provided with an aperture extending therethrough, said apertures being alined, a rotatable pipe extending through said apertures, hollow arms on said pipe and lying in front of the elements, said arms being provided with apertures for directing streams of fluid against the surfaces of the elements, and means for relatively rotating said pipe with respect to the filter elements.

9. In a filter, a plurality of movable filter elements spaced apart, each element being provided with an aperture extending therethrough, a rotatable pipe extending through said apertures, and hollow apertured arms on said pipe lying in front of the filter elements.

10. In a filter, a plurality of filter elements adapted to be moved to vary the distance between them, a pipe passing through said elements, and hollow arms on said pipe lying between the successive elements, said filter being constructed so that the arms may be removed from the path of the moving filter elements.

11. In a filter, a plurality of filter elements adapted to be moved to vary the distance between them, a rotatable pipe passing through said elements, and hollow arms on said pipe lying between the successive elements, said filter elements being provided with openings therethrough with which the arms may be moved into alinement.

12. In a filter, a filter element having an aperture therethrough extending from the center to the side wall of the filter element and means for removing material from the filter element movable through said aperture.

13. In a filter, a filter element, a rotatable pipe passing through said element, and an arm on said pipe lying in front of said element, said element being provided with an aperture so that the element may be moved past the arm.

14. In a filter, a plurality of filter elements, a rotatable sluicing pipe arranged adjacent said elements and means operative by the rotation of the pipe for moving it eccentrically.

15. In a filter, a plurality of filter elements, a rotatable sluicing pipe arranged adjacent said elements, and means for moving said pipe eccentrically.

16. In a filter, a plurality of filter elements, a rotatable sluicing pipe arranged adjacent said elements, means for rotating said pipe and means for moving said pipe eccentrically at a different rate than its rate of rotation.

17. In a filter, a filter element, a rotatable pipe, a hollow arm projecting from said pipe, and lying in front of said element, means for passing fluid through said pipe and arm and means for rotating said pipe eccentrically.

18. In a filter, a plurality of filter elements, a rotatable pipe, a plurality of apertured hollow arms on said pipe lying in front of said elements, means for passing fluid through said pipe and arms and means for rotating said pipe eccentrically.

19. In a filter, a plurality of filter elements, a rotatable pipe extending through said elements, hollow apertured arms on said pipe lying adjacent said filter elements, means for passing fluid through said pipe and arms, means for rotating said pipe and means operative by the rotation of said pipe for moving said pipe eccentrically at a different rate than its rate of rotation.

20. In a filter, a filter element, a perforated pipe arranged adjacent said element adapted to direct streams of fluid against the surface of said element and means for moving said pipe transversely and longitudinally of itself.

21. In a filter, a filter element, a perforated pipe arranged adjacent said element and adapted to direct streams of fluid against the surface of said element, means for moving said pipe transversely and longitudinally of itself and means for varying the relation of such movements.

22. In a filter, a filter element, a perforated pipe arranged adjacent said element and adapted to direct streams of fluid against the surface of said element, means for rotating said pipe, means operative by said rotation for moving the pipe eccentrically and means for varying the relation of such movements.

In testimony whereof, I have hereunto set my hand at San Francisco, California, this 2nd day of December, 1915.

CHARLES W. MERRILL.

In presence of—
W. W. HEALEY,
H. S. SHUEY.

Copies of this patent may be obtained for five cents each, by addressing the "Commissioner of Patents. Washington, D. C."